No. 777,568. PATENTED DEC. 13, 1904.
D. G. TERRYBERRY.
STRIPPING TOOL.
APPLICATION FILED FEB. 1, 1904.
NO MODEL.
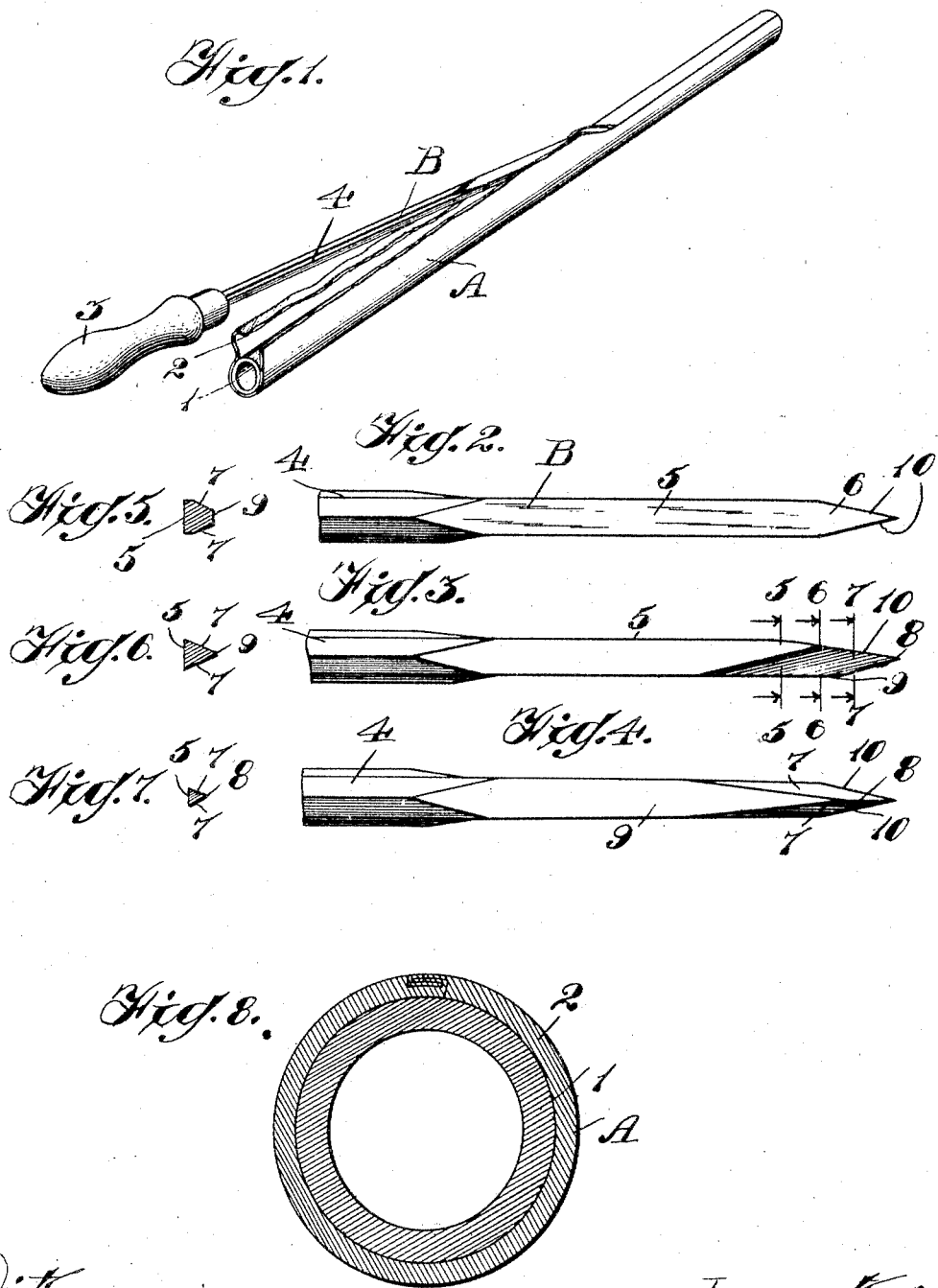

No. 777,568. Patented December 13, 1904.

UNITED STATES PATENT OFFICE.

DAVID G. TERRYBERRY, OF KENOSHA, WISCONSIN.

STRIPPING-TOOL.

SPECIFICATION forming part of Letters Patent No. 777,568, dated December 13, 1904.

Application filed February 1, 1904. Serial No. 191,559. (No model.)

*To all whom it may concern:*

Be it known that I, DAVID G. TERRYBERRY, a citizen of the United States, residing at Kenosha, in the county of Kenosha and State of Wisconsin, have invented a certain new and useful Improvement in Stripping-Tools, of which the following is a full, clear, concise, and exact description, reference being had to the accompanying drawings, forming a part of this specification.

My invention relates to stripping - tools adapted for use in stripping off metallic coatings—as, for example, for stripping the metallic sheath off from the tubular metal bars or rods used in making brass bedsteads.

The object of the invention is to provide a simple, practical, effective, and inexpensive tool of this kind.

In the accompanying drawings, Figure 1 is a perspective view of a section of tubular bar or rod with a brass covering and a tool embodying my invention in the process of stripping off said cover. Figs. 2, 3, and 4 are views of the end portion of the tool, showing different faces or sides thereof. Figs. 5, 6, and 7 are cross-sections taken on lines 5 5, 6 6, and 7 7 in Fig. 3. Fig. 8 is a cross-section of the rod or bar which is stripped, on an enlarged scale.

Referring first to Fig. 1, the rod A is understood to be formed of an inner tube 1, usually made of steel, and an outer sheath or casing 2, of brass. As shown best in Fig. 8, this outer sheath has its ends interlocked, so as to make a smooth joint or seam. The tool B is adapted to strip this sheath or cover 2 from off the inner tube 1. This tool B is made with a handle 3 and a long shank 4, which is conveniently made octagonal in cross-section. The end of the shank 4 is reduced, as at 5, and is provided with a point 6. The point 6 is constructed of two diverging inclined sides 7, which meet and form a straight cutting edge 8. A third flat side, 9, meets the two sides or faces 7 7 and forms with them diverging edges 10 10. In this way the tool will be used by inserting the point in between the sheath 2 and tube 1 and then advancing the tool along the same, as shown in Fig. 1. The sheath will be opened and spread apart so that it will fall off or can be readily removed. The edge 8 opens the sheath along the seam, and the diverging sides 7 7 spread the same, so that the operation is easily and effectively done. The flat side 9 moves along the exterior of the tube 1.

It will be understood that changes and modifications can be made in the arrangement herein set forth without departing from the spirit of my invention.

What I claim is—

A pointed tool comprising a rigid shank 4 having a handle 3 and a point 6, said point being formed by a pair of flaring inclined surfaces 7, 7, and a flat bottom face 9, the flaring faces 7, 7 uniting at their forward ends to form an inclined penetrating edge 10, and uniting with the bottom face 9 to form penetrating and separating edges 10, 10, substantially as described.

In witness whereof I hereunto subscribe my name this 22d day of January, A. D. 1904.

DAVID G. TERRYBERRY.

Witnesses:
JOHN H. CORCORAN,
JOHN L. WATTLES.